United States Patent [19]
Day et al.

[11] 3,894,994
[45] July 15, 1975

[54] CONTINUOUS METHOD OF MAKING POLYURETHANE POWDER

[75] Inventors: John T. Day, Pasadena, Md.; John G. Hollick, Beverly, Mass.

[73] Assignee: USM Corporation, Boston, Mass.

[22] Filed: Sept. 20, 1973

[21] Appl. No.: 399,462

[52] U.S. Cl. ................... 260/75 NE; 260/77.5 AA
[51] Int. Cl. ......................................... C08g 22/04
[58] Field of Search... 260/75 NE, 77.5 AA, 75 NH, 260/75 NP, 77.5 AM

[56] References Cited
UNITED STATES PATENTS

| | | | |
|---|---|---|---|
| 3,236,812 | 2/1966 | McElroy | 260/75 NE |
| 3,525,717 | 8/1970 | Butler et al. | 260/75 NE |
| 3,560,447 | 2/1971 | Bingham | 260/75 NE |
| 3,574,150 | 4/1971 | Jefferson et al. | 260/2.5 A |
| 3,620,680 | 11/1971 | Bartel et al. | 260/77.5 AM |
| 3,639,652 | 2/1972 | Mommaerts et al. | 260/75 NE |
| 3,655,627 | 4/1972 | Hutzler et al. | 260/75 NH |
| 3,787,525 | 1/1974 | McGarr | 260/77.5 CR |
| 3,817,886 | 6/1974 | McGarr | 260/75 NE |

*Primary Examiner*—H. S. Cockeram
*Attorney, Agent, or Firm*—Benjamin C. Pollard; Vincent A. White; Richard B. Megley

[57] ABSTRACT

Continuous method for preparing polyurethane resin directly in finely divided form in which method a plurality of reagents which combine to form polyurethane resin, and of which at least one is a liquid, and an inert organic liquid reaction medium in which at least one of the reagents and the polyurethane resin are insoluble and continuously mixed and vigorously agitated to form a fine dispersion of the insoluble reagent or reagents in the inert liquid, portions of the resulting dispersion are continuously discharged after a residence mixing and agitation time for reaction to thicken the dispersed material by conversion to polyurethane prior to discharge, reaction of the dispersed material discharged is continued under conditions which retard settling of the dispersed material substantially to complete the reaction between the reagents to form fine particles of polyurethane resin and the polyurethane resin particles are separated from the inert liquid.

11 Claims, 5 Drawing Figures

CONTINUOUS METHOD OF MAKING POLYURETHANE POWDER

BACKGROUND OF THE INVENTION

The demand for thermoplastic resin powders is large and steadily growing for such uses as coatings and adhesives, particularly in view of the increasing strictness of regulations regarding discharge of solvent materials into the atmosphere. In general, resin powders have been prepared by processes of grinding already formed material or by dissolving already formed resinous material and precipitating the resinous material from solution. However, by the very fact that the resinous materials to be ground are thermoplastic and often tough materials, relatively costly procedures involving chilling of the resin, for example with liquid nitrogen, have been necessary for effective grinding.

Solution and precipitation procedures for forming powders have been costly because of time involved in dissolving the resin and the precipitation which is usually effected by adding to the resin solution an organic liquid miscible with the solvent but incapable of dissolving the resin. This procedure thus involves not only solvent recovery and separation of mixed organic liquids, but also the drying of the precipitated resin with the problems of avoiding escape of organic liquid material. It has been proposed to form resin latices and produce powder by coagulation of the latices; but this process is limited in the character of material to which it is applicable.

A process for preparing polyurethane resin directly in finely divided form forms the subject of U.S. Pat. application Ser. No. 278,611, in the name of John J. McGarr, filed Aug. 7, 1972, entitled "Method of Making Polyurethane Powder" now U.S. Pat. No. 3,787,525, issued Jan. 22, 1974. According to that process, an organic polyisocyanate and organic compound containing at least two groups having active hydrogen are introduced into a body of inert liquid in which at least one of the reactants is insoluble and the other is soluble with agitation effective to emulsify the insoluble material in the inert liquid. Reaction converts the dispersed material to solid polyurethane particles. The process is effective but is dependent on the use of special surfactants and has been a batch type operation.

BRIEF SUMMARY OF THE INVENTION

It is an object of the present invention to manufacture a very fine polyurethane resin powder directly in continuous process.

BRIEF DESCRIPTION OF THE DRAWINGS

The invention will be described in connection with the drawings on the part of the disclosure in which.

BRIEF STATEMENT OF THE INVENTION

Figure 1:
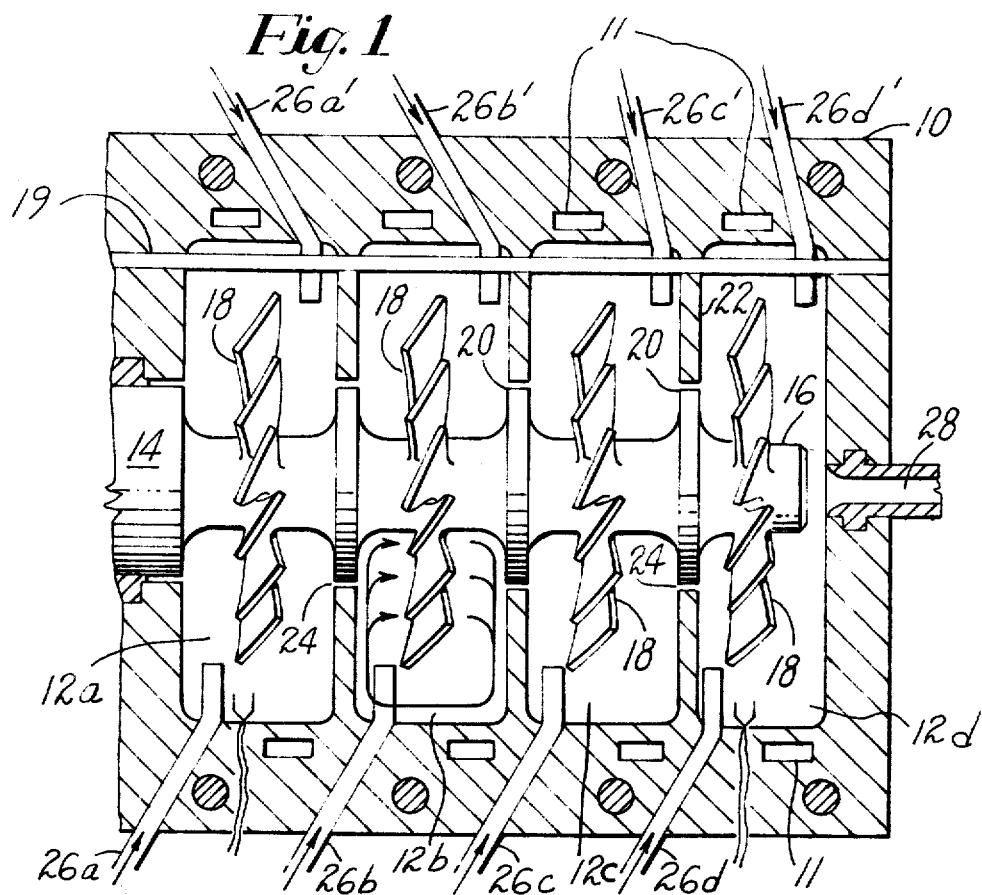
FIG. 1 is an elevational view partially in section of a mixer-emulsator device useful in practicing the method of the present invention.

Finely divided polyurethane resin is produced directly by a continuous process through a special shearing agitation mixing and reaction procedure in which an inert liquid medium and a plurality of reagents which combine to form polyurethane resin are continuously brought together at controlled rates to form a fine dispersion with the inert liquid as the continuous phase. Residence time is provided during the mixing for at least partial reaction to thicken the dispersed reagents by conversion to polyurethane. After mixing and reaction, the dispersion may be maintained under conditions which prevent settling of the dispersion for further polyurethane resin-forming reaction if needed and the polyurethane resin is then separated in the form of fine particles from the inert liquid medium.

DETAILED DESCRIPTION OF THE INVENTION

In the process of the present invention, reagents for combination to form polyurethane resin are continuously mixed and reacted as a dispersion in an inert liquid reaction medium in which at least one of the reagents and the polyurethane resin are insoluble. Mixing and dispersion are carried out in one or a series of bodies of reaction mixture to which the components of the mixture are fed continuously and from which the dispersion is continuously discharged. Agitation and mixing to form the dispersion is preferably carried out in a manner, for example by circulating flow in the body repeatedly to subject each portion of the body to shearing agitation; and the average time dwell of the reagents in the body is controlled by the volume rate of supply of components relative to the volume of the body for at least partial reaction to form polyurethane prior to discharge.

The reagents for the manufacture of polyurethane powder by the method of the present invention include at least one organic compound of which at least two groups per molecule contain active hydrogen atoms which are reactive with —NCO groups, and at least one organic compound having at least two —NCO groups per molecule.

Any organic compound or mixture of compounds having at least two —NCO groups may be used in the method to form polyurethane. Monomeric polyisocyanate adapted for use include cyclohexylene-1,4-diisocyanate, 2,4-tolylene diisocyanate, 2,6-tolylene diisocyanate, 4,4'-diphenylmethane diisocyanate, 3,3'-dimethyldiphenylmethane-4,4'-diisocyanate and 4,4'-dicyclohexylmethane diisocyanate, p-phenylene diisocyanate, m-phenylene diisocyanate, xylylene diisocyanate, 1,4-naphthylene diisocyanate, diphenyl-4,4'-diisocyanate and hexamethylene diisocyanate.

Also, —NCO terminated products, i.e. prepolymers, from reacting a stoichiometric excess of one or more monomeric polyisocyanates with one or more organic compounds having at least two groups containing active hydrogen atoms may be used, particularly in the form of the process in which both reactants are insoluble in the reaction medium. For reaction to form such prepolymers, the monomeric polyisocyanates listed above may be used.

Organic compounds having at least two groups containing active hydrogen atoms useful in the process of the present invention either directly or to form the —NCO terminated reaction products include hydroxyl terminated polyesters from reaction and polymerization of organic compounds having at least two hydroxyl groups such as glycol, hexanediol, bis-(hydroxy methyl) cyclohexane, 1,4-butanediol, diethylene glycol and mixtures of these and organic compounds having at least two carboxyl groups such as adipic acid, succinic acid, sebacic acid, azelaic acid and mixtures of these, polyesteramides, polyhydric polyalkylene ethers, polyhydric polythioethers, polypropylene glycol, polybutylene glycol, polyalkylene ether glycols from condensation of an alkylene oxide such as ethylene oxide, propylene oxide and butylene oxide with a compound containing active hydrogens such as water, ethylene glycol and propylene glycol, polytetramethylene ether glycols and mixtures of these.

Any organic compound or mixture of compounds having at least two groups per molecule containing active hydrogen, may be employed as a reactant for reaction with —NCO terminated prepolymers. For reaction with prepolymers, it is preferred that the compounds containing active hydrogens and which in this form of the method may be regarded as chain extenders, have molecular weights of from about 60 to about 300. Suitable compounds include 1,4-butanediol, 1,5-pentanediol, 1,6-hexanediol, diethylene glycol, p-phenylene-di-beta-hydroxy-ethyl ether, trimethylol propane, glycerol, alkanolamines such as diethanolamine, diamines, such as ethylene diamine, hexamethylene diamine and 4,4'-diaminodiphenyl methane.

The compound or compounds having reactive —NCO groups and the compound or compounds having groups containing active hydrogens are preferably employed in relative proportions giving a molar ratio of active hydrogen to —NCO in the range of from about 0.85:1 to about 1.15:1. Where a thermoplastic resin is desired, the ratio should be from about 0.95:1 to about 1.05:1.

Organic liquids for use as the continuous phase of the emulsion may be any liquid not reactive with the reactants, e.g., not reactive with —NCO or with active hydrogens where the product is to be a polyurethane, and in which at least one of the reactants and the reaction product are insoluble. It is ordinarily desired that such liquids be volatile for removal from the reaction product by evaporation at temperatures which will not harm the product; and that the boiling point be above the desired reaction temperature. Liquids with lower boiling points may be used but may require the use of a closed system to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling range, preferably between about 65°C. and about 200°C. such as hydrocarbons, halogenated hydrocarbons and ethers may be used. Hydrocarbon liquids, preferably aliphatic hydrocarbon liquids, such as petroleum fractions, have been found desirable because of their low cost, inertness to the reactants and ease and completeness of removal from the reaction product.

Use of a surfactant effective to aid in forming and maintaining an emulsion of very fine droplets of the immiscible reactant is of value in the operation of the method to form very fine powders.

Forming a uniform emulsion of the insoluble reactant as fine droplets of the required size with sufficient stability imposes special requirements on the surfactant in addition to chemical inertness in the reaction batch and exacting polarity requirements. Intensive agitation is needed to subdivide the reactant to the required extent and as the droplets react, they become more viscous and tacky with a tendency to deposit on surfaces such as the agitator blades and walls of the vessel in which the emulsion is formed. In addition to impeding deposition of the material on surfaces, the surfactant must also meet the conflicting requirements of letting the solidified polyurethane settle out when reaction has solidified the droplets as fine particles and yet keeping the particles from clumping together after settling.

The reaction mixture may be formed by introducing the two reactants into the organic liquid medium separately at the same time under conditions which emulsify the insoluble reactant and dissolve the soluble reactant in the liquid medium, or by separately emulsifying the insoluble reactant in a portion of organic liquid medium and combining the emulsion with a body of organic liquid medium containing the soluble organic reactant. Another procedure for forming an emulsion of the reactants involves mixing the reactants, preferably with reduced amount of catalyst or no catalyst and emulsifying the mixture in the liquid reaction medium with addition of catalyst at this or later stages. A still further procedure involves emulsifying the insoluble reactant in the organic liquid medium and adding the soluble reactant to the emulsion.

Alternatively, both of the reactants may be insoluble in the reaction medium, in which case both must be dispersed. Where both reactants are insoluble, reaction occurs between dispersed —NCO containing reactant and dispersed active hydrogen containing reactants. The mechanism of this is not entirely clear; but the surfactant requirement noted above of impeding deposition on surfaces of the agitator and emulsion vessel, and of both allowing settling of particles and prevention of clumping are similar to those in the preferred form, i.e. where one reactant is soluble in the reaction medium. In the present process it has been found that an emulsion of fine droplets of an insoluble liquid reactant for the production of finely divided polyurethane particles can be prepared using a polymeric surfactant one part of which is solvated by the inert liquid reaction medium and the other part of which is associated with the reactant droplets. For example, in order to emulsify 1,4-butanediol in naphtha, one might choose as surfactant a copolymer made from two types of monomer (a) one like vinyl pyrrolidone, vinyl alcohol, acrylamide, etc., which, if homopolymerized, would be highly compatible with 1,4-butanediol and (b) one like vinyl stearate, lauryl methacrylate, long chain alpha-olefin etc., which, if homopolymerized, would be highly compatible with naphtha. Furthermore, the molecular weight of the copolymer and the mole ratio of its monomeric constituents would be such that it would be somewhat more solvated by the naphtha than by the 1,4-butanediol so that the naphtha would be the external phase.

Not only is the molar ratio of polar to non-polar monomers important, but also the distribution of monomers in the copolymer, that is, whether the copolymer has a linear, graft or block structure. If the polar monomer contains a group such as nitrile, tertiary amine, lactam, etc., which can form strong dipole interactions with polar groups in the reactants or reaction product, a linear copolymer structure will often be adequate. However, if the polar monomer contains groups such as esters which will form only weak interactions with ester or ether groups in the reactants, then a graft or block structure is usually necessary so that by a multiplicity of such weak bonds, an adequate association can be brought about between the surfactant and the internal phase of the reaction mixture.

Since amphiphatic copolymeric surfactants having the structure described herein are useful for producing polyurethanes in powdered form, it is to be expected that homopolymers composed of amphiphatic monomers would also be useful for the same purposes. N-vinyl-3-octadecyl pyrrolidone, N-vinyl-5-dodecyl-3-morpholinone, 1-hexadecyl-acrylonitrile, N,N-dioctylaminoethyl methacrylate, etc., are examples of such monomers.

There must be some specificity to the surfactant according to the nature of the insoluble reactant chosen to produce the polyurethane. For example, in order to emulsify polytetramethylene ether glycol in heptane, one would require a surfactant with a polarity balance different from that required to emulsify hydroxyl terminated polybutylene adipate; since the former is less polar than the latter, the mole ratio of the polar moiety of the required surfactant would be less.

However, the requirement for specificity does not demand the synthesis of a new surfactant for each case. It is well known that in emulsifying oils of various HLB requirements in water one can produce such emulsions with blends of various compositions of just two surfactants, one polar and the other less-polar. For example, using Span 20 with an HLB of 8.6 and Tween 20 with an HLB of 16.7, one can make blends of these surfactants that will produce oil-in-water emulsions of both mineral oil with an HLB requirement of 10 and benzene with an HLB requirement of 15.

A parallel situation exists in making emulsions of one organic liquid in another organic liquid. For example, using two copolymers of vinyl pyrrolidone and hexadecene-1, one containing 0.56:1 mole ratio of vinyl pyrrolidone to hexadecene-1 and the other 2.22:1 mole ratio, one can emulsify in naphtha, hydroxy terminated polyethers or polyesters of different polarity by making blends of the copolymers having a polarity balance appropriate for the reactant to be emulsified.

P. A. Small (Journal of Applied Chemistry, Volume 3, page 71, 1953) has published a table of "molar-attraction constants" from which the solubility parameter of a polymer may be calculated when the structural formula, the density and the molecular weight are known. Specific numerical values are assigned to the ester, ether, aromatic groups and so on. From these values it can be calculated that the solubility parameter of polytetramethylene ether glycol, molecular weight 1,000, is about 8.5, whereas the solubility parameter of a polyurethane made from one equivalent of this polyether glycol, one equivalent of 1,4-butanediol and two equivalents of diphenylmethane diisocyanate is about 10.5. Thus, there is an appreciable increase in polarity when the polyether is converted to a polyurethane. Based on these considerations, one would not expect the ideal surfactant for emulsifying the polyether to be ideal surfactant for preventing agglomeration of the polyurethane product. Indeed, it would appear desirable for the action of the surfactant to be somewhat less than ideal, so that the particles of product will be large enough to settl rather than become a fine, stable dispersion which would render difficult the removal of the product from the reaction medium.

The molecular weight of the surfactant must be at least 2,000, preferably at least about 7,000, in order to provide a steric barrier of sufficient thickness to minimize coalescence of the liquid droplets of reactant and to prevent agglomeration of the solid particles of reaction product. The higher the molecular weight of the solvated portion of the surfactant molecule, the greater is the number of possible chain configurations it can assume. As two droplets of emulsion, or two particles of product, approach one another there is a reduction in available volume, an increase of interaction between the solvated chains associated with one particle and those associated with the other particle and a corresponding reduction in the number of possible chain configurations. This loss in configurational entropy provides the necessary repulsive force between droplets and between particles.

For emulsifying the insoluble liquid reactant in the present method and for preventing agglomeration of the reaction product, the products of copolymerizing vinyl pyrrolidone with an alkylated olefin to give copolymers with molecular weight of at least 7,000 have been found to be particularly effective surfactants. The nature and quantity of surfactant used will depend on a variety of factors including the physical properties of the reactants and of the inert liquid medium, the efficiency of the emulsifying equipment, the size of reaction product particle desired and so on. In general, from about 0.1 to about 10% of surfactant based on the weight of the emulsified reactant will be used.

In order to provide that at least about 95% by weight of the reaction product particles are in the range of 1 to 300 microns in diameter, that is, that they will be fine and yet settle readily, the quantity and effectiveness of the surfactant must be coordinated with the degree of agitation of the reaction mixture. The higher the molecular weight and the more suitable the balance of polar and less-polar groups in the surfactant with respect to the polarity of the emulsified reactant and of the reaction product, the less surfactant will be needed to produce the desired particle size when a given amount of agitation is used. Conversely, intense agitation can, to some extent, overcome deficiencies in the quality of the surfactant.

Catalysts are ordinarily employed to improve the rate and completeness of reaction. Any of a variety of known catalysts can be used including dibutyl tin dilaurate, stannous octoate, tertiary amines such as N-methylmorpholine and triethylamine, mercury catalysts such as phenyl mercuric propionate, lead naphthenate, lead octoate and others. Very small amounts, only sufficient to provide catalytic action, are used and it is preferred that the amount be from about 0.01 to about 1% by weight based on the weight of the reactants. Catalyst may be added at one or more stages of the process to control the speed of the reaction. Thus, where the polyisocyanate and the active hydrogen materials are mixed in one stage and dispersed in the organic liquid medium in a second stage, premature reaction which might interfere with mixing and dispensing may be avoided where a part of all of the catalyst is introduced in the second or later stages. Where the polyisocyanate and some or all of the active hydrogen materials are dispersed in organic liquid medium in a first stage, some or all of the catalyst may be supplied to the first stage and the remainder, if any, added at a later stage. Other variations of the process may use other variations of the stage and amount of catalyst addition to avoid premature reaction or to speed up reaction to reach the desired extent of reaction.

Apparatus suitable for carrying out the process will preferably include a number of separate chambers with an agitator in each chamber and with passages between the chambers through which mixed material from one chamber is passed to the next. A suitable device is that shown in the copending application of John T. Day, filed Oct. 12, 1972, Ser. No. 297,078, entitled "Mixer - Emulsator", now U.S. Pat. No. 3,807,703, issued Apr. 30, 1974; but other devices may be used. The device of that application as shown in FIG. 1 includes a housing 10 having passageways 11 for circulation of temperature control fluid, a plurality of axially aligned parallel chambers 12 each of which is individually designated as 12a through 12d respectively, and a rotor 14 including a shaft 16 carrying mixing blades 18 in the chambers extending axially through the housing 10 and the chambers 12. In the form shown, lands or shoulders 20 on the rotor 14 cooperate with annular extensions or shelves 22 from the inner wall of the housing 10 to form annular passages 24 between the chambers 12 and to separate the space within the housing into the chambers. Inlets 26a and 26a' are provided to introduce components of the reaction mixture into the first chamber 12a of the device for mixing and reaction and further inlets individually designated 26b and 26b' through 26d and 26d' are provided to introduce components into chambers 12b through 12d.

In the mixing device, the materials within the chambers 12 are circulated within each chamber as illustrated by the arrows (chamber 12b) so that a given quantity of material is repeatedly subjected in each of the chambers to intensive shearing action from the rotor blades 18 to effect mixing and fine dispersion of insoluble components. Baffles 19 may be disposed at intervals around the periphery of the chambers 12 to interrupt rotational motion induced in the material in the chambers by rotation of the rotor 14 and mixing blades 18. Portions of the mixture are withdrawn through an annular passage 24 and passed to the next chamber and this procedure continues until discharge of the product through the opening 28 at the end of the housing.

It is considered important that the agitation have an intensity sufficient to break up incoming insoluble reagents to droplets of less than about 150 microns in size. These small droplets provide a high ratio of surface area to volume so that the reagent in the droplet is available for reaction with other reagents in the reaction medium. Also, separation and depostion on the walls of the apparatus by centrifugal effect is minimized.

Since fresh reactive materials are continously supplied to the mixing chamber and mixture continuously withdrawn, it will be seen that the material within the chamber includes a mixture of materials freshly arrived in the chamber and material that has been in the mixer for a time. Reactive material which has been in the chamber for a time will have reacted to a greater extent and be less subject to agglomeration than freshly arrived material and this factor will be improved by using a low rate of feed of material relative to the volume of the chamber. On the other hand, the difference between the greatest time that older particles will have been present in the chamber on an average and the least time freshly arrived particles will hve been in the chamber when a given portion is discharged through the annular passage will be greater as the volume of the chamber relative to the rate of feed of material through the chamber increases. These factors must be balanced to insure that the reactive materials have stayed in the mixing chamber sufficiently long to prevent or reduce the tendency to agglomeration while at the same time avoiding excessive differences in reactive history times of particles of the discharged mixture.

A further factor is that the concentration of soluble reagent, e.g. diisocyanate, in the reaction mixture in a chamber is affected by the size of, or dwell time in that chamber. That is, the larger the body of dispersion, e.g. of fresh and partly reacted glycol and diol in inert liquid reaction medium within a chamber, the more dilute the soluble reagent, e.g. diisocyanate, because a substantial part of earlier introduced diisocyanate will have been taken up by or reacted with the diol leaving the accompanying inert liquid to dilute the incoming diisocyanate. In other words, in the larger chambers there will be a lower rate in terms of volume per unit time of soluble reagent made available for reaction relative to volume of inert liquid reaction medium in the chamber. It is thought that this factor may tend to even out the amount of soluble reagent taken up by the droplets on the assumption that with the more dilute solution of the soluble reagent the less fully reacted droplets will take up soluble reagent at a higher rate than will the more fully reacted droplets. It is also noted that the droplets of glycol and diol take up diisocyanate from solution at a high rate so that droplets passing the diisocyanate inlet and pick up most of the incoming diisocyanate but individual droplets pass the inlet so rapidly that an individual droplet does not take up a great percent of its reactive capacity in a single pass under the intense agitation. Under these conditions the —NCO to —OH ratio in the droplets is evened out because each droplet will make a number of passes by the diisocyanate inlet before being discharged from the chamber.

The factor of dilution of the incoming soluble reagent is also dependent on the ratio of liquid reaction medium to reactive materials. Concentrations on the basis of percent by weight of polyurethane in the final reacted mixture should be below about 60%, preferably from about 15 to about 45% by weight based on the total weight of the mixture.

With most reactive polyurethane forming systems, it is found that from a volume per minute at least about equivalent to the volume of the mixing chamber and preferably twice the volume per minute relative to the volume of the mixing chamber give desirable results. This range, while preferred, is dependent on the speed of the reaction and with faster reactions, i.e., from use of more reactive components or more active catalyst, it may be desirable to increase the rate of supply of materials.

While the apparatus as shown includes four chambers, 12a through 12d, which is of advantage in that it attends to equalize the time for each particle of the reaction mixture to pass through the mixer, it will be understood that a lesser number of chambers may be used and that, in fact, the mixing may involve only a single mixing and reaction chamber into which the reagents and inert liquid are supplied continuously and from which the mixture is withdrawn continuously and a zone in which the dispersion is maintained under conditions which prevented settling of the dispersion for a period of time to allow completion of reaction before a settling out of the finely divided reaction product. Conditions effective to prevent settling include a mild agitation or the use of fluid jets or the like.

Figure 2:
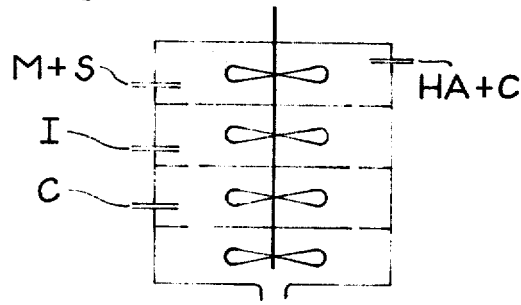
FIG. 2 is a flow diagram illustrating one procedure for practicing the method of the present invention.

Formation of the reactive emulsion may be effected in a variety of ways. Thus, (see FIG. 1 and the flow diagram of FIG. 2) the surfactant materials and the inert organic liquid medium M may be supplied to the mixer through a first inlet 26a into the first chamber 12a of the mixer, and the components H having active hydrogens for reaction with the isocyanate and catalyst C introduced into the first chamber through the inlet 26a' and agitated by the rotor blades 18 to form an emulsion in the inert organic liquid medium. This emulsion may be withdrawn continuously through the annular orifice 24 and enter the second chamber 12b where the emulsion is maintained by the rotor blades 18. A polyisocyanate I may be supplied through the inlet 26b to the second chamber for reaction with the dispersed active hydrogen materials H. Ordinarily, the polyisocyante I is soluble in the inert liquid M such as naphtha, so that the reaction is an interfacial reaction between the dissolved polyisocyanate and the dispersed active hydrogen material prepared in the first chamber 12a. If desired, catalyst C in addition to that mixed with the active hydrogen material H may be supplied through the inlet 26c for mixture with dispersed and partially reacted material which has been discharged from the second chamber 12b through the annular orifice 24 into the third chamber 12c.

From the third chamber 12c, the reaction mixture may pass to a further chamber or chambers for further mixing or may be discharged to a zone where it is subjected to treatment such as mild agitation to prevent or reduce settling of the reactive dispersed material prior to completion of the polyurethane forming reaction.

Figure 3:
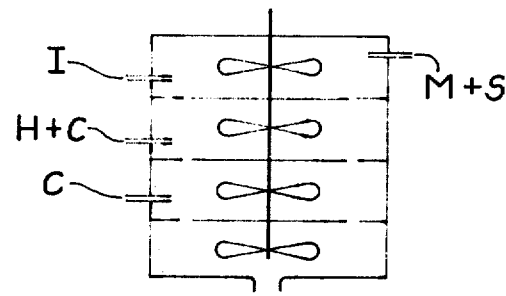
FIG. 3 is a flow diagram illustrating another embodiment of the invention.

As an alternative to the above procedure (see the flow diagram of FIG. 3), the polyisocyanate I may be dissolved in the inert liquid M in a chamber and the active hydrogen material dispersed directly in the isocyanate solution in a later chamber. In this case, it may be desirable to withhold all or a portion of the catalyst C from the earlier chambers in order that reaction may not interfere with effective emulsification of the active hydrogen material. Catalyst withheld from the earlier chambers may be added in subsequent chambers.

Figure 4:
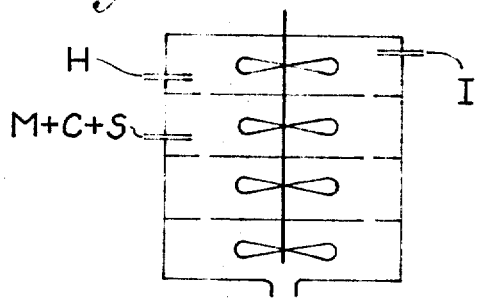
FIG. 4 is a flow diagram illustrating a further embodiment of the invention.

In a still further alternative (see the flow diagram of FIG. 4), the active material H and the polyisocyanate I may be mixed in the first chamber and dispersed in the inert organic liquid M in a subsequent chamber. Using this procedure, it is important to withhold all or a portion of the catalyst C from the first chamber in order that the reaction may not proceed to a point which may interfere with fine dispersion of the reactive materials in the inert organic liquid. Following this procedure, needed catalyst C may be added at one or more later mixing chambers.

Figure 5:
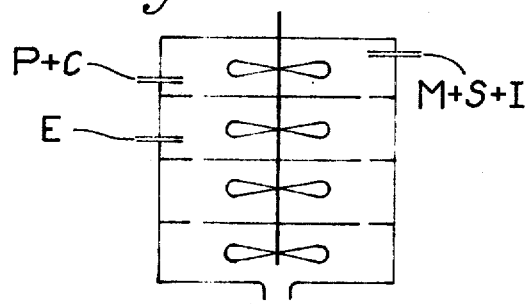
FIG. 5 is a flow diagram illustrating a still further embodiment of the invention.

Still other alternatives are available (see flow diagram of FIG. 5), such as supplying a polymeric polyol, P, such as hydroxyl terminated polyester or a polyalkylene ether glycol, surfactant S, catalyst C and polyisocyanate I to form a prepolymer dispersion in inert organic reaction, M, in the first chamber and adding a chain extender E which may be short chain glycol such as 1,4-butanediol, which may also be insoluble in the inert liquid, to the prepolymer emulsion in a later chamber.

The following examples are given as an aid in understanding the invention, but it is to be understood that the invention is not restricted to the particular reagents, procedures or other conditions employed in the Examples.

EXAMPLE 1

A mixing and emulsating device like that shown in the drawing and fitted with metering feed pumps for supplying components of the reaction mixture continuously and at controlled rates through inlet passages to the mixing chambers, was brought to a temperature of about 90°C. by circulation of temperature control fluid through the channels in the housing; and the rotor carrying the mixing blades was driven at a speed of 3600 r.p.m. The mixer had four chambers of which the volume of each was about 205 ml.

Surfactant comprising a copolymer of vinyl pyrrolidone and hexadecene-1 having an average molecular weight of about 7300 and a mol ratio of vinyl pyrrolidone to hexadecene-1 of 1:1.8 at the rate of 2.1 grams per minute, liquid paraffinic hydrocarbon mixture (boiling range of 174°C. to 207°C.) at a temperature of 80°C. at the rate of 120 grams per minute (166 ml. per minute) and dibutyl tin dilaurate (50% by weight solution in the same liquid hydrocarbon) at the rate of 0.74 grams per minute were introduced into the first of the four chambers of the mixing and emulsating apparatus.

Polytetramethylene ether glycol (molecular weight 1040 and —OH number 107.8) at the rate of 47.2 grams per minute (43.0 ml. per minute) and 1,4-butanediol at the rate of 4.1 grams per minute (4.2 ml. per minute) were fed to a static mixer where the glycol and diol were intimately blended and the mixture was discharged continously into the same first chamber of the mixing and emulsating apparatus. In this chamber, the mixing blades operated on the materials to form a fine emulsion of the glycol and diol in the liquid hydrocarbon in the first chamber. Portions of the emulsion were continuously passed through the annular space between the shoulder on the rotor and the shelf forming the lower wall of the chamber into the second chamber of the apparatus at a volume rate equal to the sum of the volume rates of supply of the components, e.g. the liquid hydrocarbon, the glycol and the diol. Since the volume of materials supplied to the upper chamber was a total of about 215 ml. per minute, the average dwell time of the mix in that chamber was about .96 minutes.

In the second chamber, 4,4'-diphenylmethane diisocyanate at a temperature of about 60°C. was introduced continuously at the rate of 22.3 grams, (18.7 ml.), per minute and rapidly continuously mixed with the emulsion in the chamber. The diisocyanate material dissolved in the liquid hydrocarbon substantially immediately to form a solution in which it was available for interfacial reaction with the dispersed droplets of the glycol and diol. Since the volume of the diisocyanate supplied to the second chamber is 18.7 ml. per minute and the volume of the emulsion from the upper chamber is 215 ml. per minute, or a total of about 234 ml. per minute, the average dwell time of materials in the second chamber is about .89 minutes before discharge through the annular space to the third chamber of the apparatus. Due to interfacial reaction between the glycol and diol and the diisocyanate, the droplets leaving this chamber were reacted to at least a limited extent to thicken them to improve resistance to agglomeration.

Material was discharged from the annular spaces to the third and fourth chambers and successively was subjected to agitation by the agitating blades in the chambers which was both effective to insure constant movement of the hydrocarbon liquid with its content of the dissolved diisocyanate relative to the surfaces of the droplets and also helped to prevent agglomeration of small droplets into larger droplets. The average dwell time of material in each of these chambers was .89 minutes.

The material discharged from the fourth chamber was at a temperature of 90°c. to 92°C. and was in the form of dispersed fine particles of polyurethane in a continuous phase of the liquid hydrocarbon. This dispersion was gently agitated to prevent settling for a period of about 10 minutes and then allowed to settle. After holding overnight, the supernatant liquid was poured off and replaced with n-hexane to wash traces of catalyst from the surface of the particles. The particles were then again allowed to settle and the supernatant liquid poured off. Thereafter, the particles which had settled out together with residual hexane were filtered, the filtered material was spread on a drying tray and dried in a current of air.

The resulting polyurethane was in the form of a fine powder with an average particle size of about 40 microns. The resin had a melting range of 125°C. to 165°C. and a film of resin had a tensile strength of about 3360 pounds per square inch, a 100% elongation modulus of 655 pounds per square inch and a 300 elongation modulus of 1015 pounds per square inch.

EXAMPLE 2

Procedure similar to Example 1 was follwed in which vinyl pyrrolidone copolymer surfactant at the rate of 3.8 grams per minute, the liquid paraffinic hydrocarbon at the rate of 284 ml. per minute and dibutyl tin dilaurate at the rate of .028 grams per minute (200 parts per million on the weight of the urethane-forming reagents) were supplied to the first chamber and hydroxyl terminated polybutylene adipate (molecular weight 1000 and —OH number 111.2) at the rate of 87 grams per minute (79 ml. per minute) and 1,4-butanediol at the rate of 7.75 grams per minute (7.9 ml. per minute) were fed to a static mixer and the resulting mixture discharged continuously into the same chamber for emulsification in the liquid hydrocarbon. The total volume of material supplied to the chamber was about 375 ml. per minute and the average dwell time of the mix before passing from the first chamber to the second chamber was about 0.55 minutes.

In the second chamber 41.95 grams per minute (35.2 ml. per minute) of 4,4'-diphenylmethane diisocyanate at a temperature of about 60°C. was introduced continuously and rapidly mixed with the emulsion in the chamber. The sum of the volume of diisocyanate and the volume of emulsion entering the chamber per minute is about 417 ml. per minute and the average dwell time of the materials in the seond chamber is about 0.5 minutes before passing to the third and fourth chambers.

After dwell time of 0.5 minutes in each of the third and fourth chambers, the mixture was discharged at a temperature of about 60°C. in the form of a dispersion of fine particles of polyurethane in a continuous phase of the liquid hydrocarbon. After settling of the polyurethane particles, the supernatant liquid was poured off and replaced with n-hexane to wash traces of catalyst from the surface of the particles. The particles were allowed to settle from the hexane and the supernatant liquid poured off. Further liquid was removed by filtration and the filtered material was dried in a current of air.

EXAMPLE 3

The procedure of Example 2 was repeated except that in the third chamber 0.14 grams per minute of dibutyl tin dilaurate (as a 50% solution in the liquid hydrocarbon) were introduced and thoroughly mixed with the emulsion.

The resulting polyurethane was a fine powder with an average particle size of 14 microns.

EXAMPLE 4

The procedure of Example 2 was repeated but the rate of feed of the vinyl pyrrolidone copolymer surfactant was reduced to 1.9 grams per second and the rate of feed of dibutyl tin dilaurate was increased to .14 grams per minute.

The powder obtained had an average particle size somewhat larger than those of Examples 2 and 3, namely, about 22 microns. The polyurethane had the following properties: Apparent Viscosity-0.48, Softening Point (Fisher-John)-118°C., Load for 100% Elongation-605 lbs./sq. inch, Load for 300% Elongation- 741 lbs./sq. inch and Tensile Strength- 2949 lbs./sq. inch.

EXAMPLE 5

The procedure of Example 4 was repeated but the rate of feed of surfactant was cut down to .95 grams per minute. The resulting product was a polyurethane powder having an average particle size of about 30 microns.

EXAMPLE 6

The procedure of Example 2 was repeated but the rate of feed of the liquid hydrocarbon was cut down to 142 ml. per minute and the rate of catalyst feed was 0.028 grams per minute. The resulting product was a fine polyurethane powder having an average particle size of about 14 microns.

EXAMPLE 7

A mixing and emulsating device like that employed in Example 1 was brought to a temperature of 90°C. and the rotor was driven at a speed of 3,600 r.p.m.

To the first chamber there was fed hydroxyl terminated polybutylene adipate (molecular weight 1,000 and —OH No. 111.2) at the rate of 87 grams per minute (79 ml. per minute), 1,4-butanediol at the rate of 7.75 grams per minute (7.9 ml. per minute), 4,4'-diphenylmethane diisocyanate at a temperature of 60°C. at the rate of 41.95 grams per minute (35.2 ml. per minute) and dibutyl tin dilaurate at the rate of .00175 grams per minute (12.5 parts per million on the rate of the urethane forming reagents). The total volume of materials supplied to the chamber was about 126 ml. per minute and the average dwell time of the mix before passing from the first chamber to the second chamber was about 1.7 minutes.

In the second chamber liquid paraffinic hydrocarbon (boiling range of 174°C. to 207°C.) at a temperature of 80°C. at the rate of 284 ml. per minute, vinyl pyrrolidone copolymer surfactant at the rate of 3.8 grams per minute and dibutyl tin dilaurate (50% by weight solution in the same liquid hydrocarbon) at the rate of 0.56 grams per minute were fed to a static mixer and the resulting mixture discharged continuously into the second mixing chamber where the agitation emulsified the mixture discharged from the first chamber in the liquid hydrocarbon as the continuous phase. The total volume of materials supplied to the second mixing chamber was 410 ml. per minute and the average dwell time of the mix in the second chamber to the third chamber was about 0.5 minutes. From the second chamber the emulsion passed to a third chamber of a size providing an average dwell time of 0.5 minutes and then passed to a fourth chamber of a size providing a dwell time of about 0.3 minutes.

The mixture was discharged from the fourth chamber at a temperature of about 60°C. in the form of a discharge of fine particles of polyurethane resin in a continuous phase of the liquid hydrocarbon. After settling of the polyurethane particles, the supernatant liquid was poured off and with n-hexane to wash traces of catalyst to the surface of the particles. The particles were allowed to settle from the hexane and the supernatant liquid poured off. Further liquid was removed by filtration and the liquid was dried in cold air. The resulting polyurethane was a fine powder with an average particle size of about 14 microns. The polyurethane had the following properties: Inherent Viscosity-0.50, Softening Point (Fisher-John)-118°C., Load for 100% Elongation-587 lbs./sq. inch, Load for 300% Elongation-720 lbs./sq. inch and Tensile Strength-2808 lbs./sq. inch.

EXAMPLE 8

A mixing and emulsating device like that employed in Example 1 was brought to a temperature of 60°C. and the rotor was driven at a speed of 3,600 r.p.m.

To the first chamber there was fed a mixed stream comprising vinyl pyrrolidone copolymer at the rate of 4.0 grams per minute, dibutyl tin dilaurate at the rate of 0.55 grams per minute and liquid paraffinic hydrocarbon (boiling range of 174°C. to 207°C.) at a temperature of 40°C. at the rate of 284 ml. per minute, a second stream comprising polytetramethylene ether glycol (molecular weight 1,040 and —OH No. 107.8) at the rate of 89.7 grams per minute (81.7 ml. per minute) and 1,4-butanediol at the rate of 7.75 grams per minute (7.9 ml. per minute) which are passed first through a static mixer and then to the first chamber and stream of 4,4'-diphenylmethane diisocyanate with a temperature of 60°C. at the rate of 42.2 grams per minute (35.5 ml. per minute). The total volume of materials supplied to this chamber was about 415 ml. per minute and the average dwell time of about 0.5 minutes. From this first chamber the emulsion was passed to a second, third and fourth chamber providing an average dwell time in each chamber of 0.5 minutes.

The mixture was discharged from the fourth chamber at a temperature of about 60°C. in the form of a dispersion of fine particles of polyurethane resin in a continuous phase of the liquid hydrocarbon. After settling of the polyurethane particles, the supernatant liquid was poured off and washed with n-hexane to wash traces of catalyst to the surface of the particles. The particles were allowed to settle from the hexane and the supernatant liquid poured off. Further liquid was removed by filtration and the powder was dried in cold air.

Having thus described our invention and what we claim as new and desire to secure as Letters Patent of the United is:

1. Continuous method for preparing polyurethane resin directly in finely divided form from reaction in a mixture of which the components include a first reactant comprising at least one organic polyisocyanate, a second reactant comprising at least one organic compound containing at least two groups having active hydrogen, a catalyst for the polyurethane forming reaction, at least one of said reactants being a liquid under reaction conditions, and an inert organic liquid reaction medium in which one of the reactants and the polyurethane resin are insoluble, in which method said insoluble reactant is continuously dispersed with vigorous agitation in said inert liquid in a mixing zone to form a body of a fine dispersion of said insoluble reactant in a continuous phase of the inert liquid, portions of said dispersion are continuously discharged from said body to a further mixing zone, a further component or further components of the reaction mixture for forming polyurethane is or are supplied continuously to said further mixing zone at a rate correlated with the rate of supply of insoluble reactant to give relative proportions for reaction to form polyurethane and is or are mixed by vigorous agitation with said dispersion, portions of the mixture in said further mixing zone are continuously discharged after a residence time controlled by the rate of supply of said components to said mixing zones to secure thickening by at least partial reaction of the dispersed reactants in said discharged portion to form dispersed particles of polyurethane, reaction of the reactants in said discharged portion is continued under conditions which retard settling of the dispersed material substantially to complete the reaction and the polyurethane resin particles are separated from the inert liquid.

2. Continuous method for preparing finely divided polyurethane resin directly as defined in claim 1 in which components of said reaction mixture are continuously introduced into a body of mixed components in a first mixing zone, said body of components is circulated for repeated rapid shearing agitation mixing of each portion of the body in said zone to incorporate said introduced components throughout said body and portions of said body are continuously discharged from said zone.

3. Continuous method for preparing finely divided polyurethane resin directly as defined in claim 2 in which mixing and agitation are effected in a series of zones, in which a surfactant is employed to aid in dispersion of said insoluble reactant or reactants in said inert organic liquid reaction medium, and in which portions of said body of mixed components discharged from said first zone are continuously introduced into a body of mixed components in at least one successive mixing zone and circulated for repeated rapid shearing agitation mixing of each portion of the body of components, and portions of the body of mixed components in each successive zone are discharged continuously.

4. Continuous method for preparing finely divided polyurethane resin directly as defined in claim 3 in which the rate of introduction per minute of reaction mixture components is from about 0.5 to about 2.0 times the volume of mixed components in the mixing zone in which organic compound containing at least two groups having reactive hydrogen is brought together with the reactant comprising at least one organic polyisocyanate so that the average dwell in the reaction chamber is from 2 minutes to ½ minute to cause reaction between the organic compound having active hydrogen and the polyisocyanate to thicken the dispersed reactant material by formation of polyurethane at the time of withdrawal from said zone.

5. Continuous method for preparing finely divided polyurethane resin directly as defined in claim 3 in which the components continuously introduced into said first mixing zone include said inert organic liquid reaction medium and at least one organic compound insoluble in said inert liquid and containing at least two groups having active hydrogen, mixing in said zone forms an emulsion of droplets of said insoluble organic compounds with said inert liquid as the continuous phase, said emulsion is continuously discharged from said first mixing zone and introduced into a second mixing zone and in which at least one organic polyisocyanate is introduced into said second mixing zone for mixing with the body of components and reaction with the organic compound of said droplets to form fine particles of polyurethane.

6. Continuous method for preparing finely divided polyurethane resin as defined in claim 4 in which the components continuously introduced into said first mixing zone include said inert organic liquid reaction medium, a chain extender comprising an —OH terminated organic compound having a molecular weight of from about 60 to about 300 and a member of the group consisting of polyalkylene ether glycols and hydroxyl terminated polyesters, said chain extender and said polyalkylene ether glycol and hydroxyl terminated polyesters being insoluble in said inert liquid, said shearing agitation mixing forms an emulsion of droplets less than 150 microns in size with said inert liquid medium as the continuous phase, said emulsion is continuously discharged from said first mixing zone and introduced into a second mixing zone and in which at least one organic polyisocyanate is introduced into said second mixing zone for mixing with the body of components and reaction with the organic compound of said droplets to form fine particles of polyurethane.

7. Continuous method for preparing finely divided polyurethane resin directly as defined in claim 3 in which said reactant comprising polyisocyanate and reactant comprising an organic compound containing at least two groups having active hydrogen are continuously introduced into said first agitation mixing zone and discharged from said zone as a uniform mixture, the mixture discharged from said first zone and inert organic liquid reaction medium are continuously introduced into a body of a mixture of these components in a succeeding mixing zone and combined to form an emulsion of droplets of said mixture having a size less than 150 microns, and a catalyst is supplied to said succeeding mixing zone to give a speed of reaction between said polyisocyanate and said compound having active hydrogen to thicken the droplets at the time of discharge.

8. Continuous method for preparing finely divided polyurethane resin directly as defined in claim 4 in which polyisocyanate and a member of the group consisting of polyalkylene ether glycols and hydroxyl terminated polyesters are continuously introduced into said first agitation mixing zone and discharged from said zone as a uniform mixture, the mixture is discharged from said first zone, a chain extender comprising an organic compound having at least two active hydrogens and having a molecular weight of from about 60 to about 300 and inert organic liquid reaction medium are continuously introduced into a body of a mixture of these components in a succeeding mixing zone and combined to form an emulsion of droplets of said mixture having a size less than 150 microns and a catalyst is supplied to give a speed of reaction between said polyisocyanate, said polyester or polyalkylene ether glycol and said chain extender to thicken the droplets at the time of discharge from said succeeding mixing zone.

9. Continuous method for preparing finely divided polyurethane resin directly as defined in claim 3 in which said reactant comprising polyisocyanate, reactant comprising an organic compound comtaining at least two groups having active hydrogen and inert organic liquid reaction medium in which at least one of said reactants and the polyurethane resin are insoluble are continuously introduced into said first agitation mixing zone and combined to form an emulsion of droplets having a size less than 150 microns with said inert liquid as the continuous phase, catalyst is supplied continuously to give a speed of reaction between said reactants to thicken the droplets and the emulsion discharged from said first zone is continuously introduced into a body of a mixture of these components in a succeeding mixing zone.

10. Continuous method for preparing finely divided polyurethane resin directly as defined in claim 4 in which polyisocyanate, a member of the group consisting of polyalkylene ether glycols and hydroxyi terminated polyesters and inert organic liquid reaction medium in which said glycol and polyester are continuously introduced into said first agitation mixing zone and combined to form an emulsion droplets of having a size less than 150 microns with said inert liquid as the continuous phase, catalyst is supplied for the reaction between said polyisocyanate and said glycol or hydroxyl terminated polyester and the emulsion discharged from said first zone is continuously introduced into a body of a mixture of these components in a succeeding mixing zone.

11. Continuous method for preparing finely divided polyurethane resin directly as defined in claim 3 in which a member of the group consisting of polyalkylene ether glycols and hydroxyl terminated polyesters and a polyisocyanate are continuously introduced into said first mixing zone in a molar ratio providing an —NCO to —OH ratio about 2:1, an inert organic liquid reaction medium in which said polyalkylene ether glycol and polyester are insoluble is continuously introduced and mixed with said glycol or polyester and polyisocyanate by shearing agitation to form an emulsion of droplets less than 150 microns in size with said inert liquid medium as the continuous phase, said emulsion is continuously discharged and introduced into a second mixing zone and a chain extender comprising an organic compound having at least two active hydrogens and having a molecular weight of from about 60 to about 300 is introduced into said second mixing zone for reaction with the available —NCO groups of the product from said first mixing zone to form fine particles of polyurethane.

* * * * *